(12) United States Patent
Dickens et al.

(10) Patent No.: US 10,815,822 B2
(45) Date of Patent: Oct. 27, 2020

(54) BORESCOPE PLUG ASSEMBLY

(71) Applicant: United Technologies Corporation, Farmington, CT (US)

(72) Inventors: Jeffrey D. Dickens, Palm Beach Gardens, FL (US); Brian K. Richardson, Jupiter, FL (US); Russell B. Hanson, Jupiter, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 141 days.

(21) Appl. No.: 15/995,972

(22) Filed: Jun. 1, 2018

(65) Prior Publication Data
US 2019/0368375 A1 Dec. 5, 2019

(51) Int. Cl.
*F01D 21/00* (2006.01)

(52) U.S. Cl.
CPC ........ *F01D 21/003* (2013.01); *F05D 2240/14* (2013.01); *F05D 2240/55* (2013.01); *F05D 2260/83* (2013.01)

(58) Field of Classification Search
CPC ...... F01D 21/003; F01D 21/00; F01D 25/285; F05D 2240/14; F05D 2240/55; F05D 2260/83; G01M 15/14; B64F 5/60; G01N 21/954; G02B 23/2467
See application file for complete search history.

(56) References Cited

U.S. PATENT DOCUMENTS

| | | | |
|---|---|---|---|
| 3,252,283 A * | 5/1966 | Jackson | F02C 7/26 60/39.281 |
| 3,362,160 A | 1/1968 | Bourgeois | |
| 3,911,672 A * | 10/1975 | Irwin | F02C 7/266 60/796 |
| 3,936,217 A | 2/1976 | Travaglini et al. | |
| 4,406,580 A * | 9/1983 | Baran, Jr. | F01D 21/003 415/118 |
| 4,492,381 A * | 1/1985 | Cooper | F16J 15/32 277/321 |
| 4,815,276 A * | 3/1989 | Hansel | F01D 21/003 415/118 |
| 5,115,636 A | 5/1992 | Zeiser | |
| 5,851,095 A | 12/1998 | Ellis | |

(Continued)

FOREIGN PATENT DOCUMENTS

CN CN202994190 U 6/2013

OTHER PUBLICATIONS

EP search report for EP19165980.4 dated Oct. 11, 2019.

*Primary Examiner* — Kenneth Bomberg
*Assistant Examiner* — Hakeem M Abdellaoui
(74) *Attorney, Agent, or Firm* — Getz Balich LLC

(57) ABSTRACT

A system for an engine defined about an axial centerline includes an inner case that includes a bushing, a duct case radially outward of the inner case with respect to the axial centerline, and a seal located on the duct case. The system further includes a borescope plug assembly that traverses the seal and the bushing in mounting to the inner case. The borescope plug assembly includes a spring, a housing sleeve, and a washer sleeve at least partially nested within the housing sleeve. The spring is isolated from the seal by the housing sleeve and the washer sleeve such that the spring is contact-free with respect to the seal.

16 Claims, 7 Drawing Sheets

(56) References Cited

U.S. PATENT DOCUMENTS

| | | | |
|---|---|---|---|
| RE43,928 E * | 1/2013 | Clouse | F01D 17/02 |
| | | | 415/115 |
| 9,157,638 B2 * | 10/2015 | Ponziani | F23R 3/60 |
| 9,512,737 B2 | 12/2016 | Hatcher, Jr. et al. | |
| 10,465,610 B2 * | 11/2019 | Huang | F23R 3/002 |
| 2009/0183510 A1 * | 7/2009 | Bielass | F02B 37/16 |
| | | | 60/611 |
| 2014/0056666 A1 | 2/2014 | Marc | |

* cited by examiner

BORESCOPE PLUG ASSEMBLY

STATEMENT REGARDING FEDERALLY SPONSORED RESEARCH OR DEVELOPMENTS

This invention was made with Government support awarded by the United States. The Government has certain rights in this invention.

BACKGROUND

Engines, such as those which power aeronautical and industrial equipment, may employ a compressor to compress air that is drawn into the engine and a turbine to capture energy associated with a combustion of a fuel-air mixture in a combustor. During various engine activities (e.g., development, test, maintenance, etc.), there may be a need/desire to inspect one or more components of the engine. A borescope is a device that is frequently used as part of an inspection.

A borescope may have to traverse one or more ducts (or, analogously, one or more cases/case structures) of the engine to be located proximate a component or region of interest inside the engine. For example, FIG. 1A illustrates a (portion of a) borescope assembly 154 that traverses at least an outer fan duct case 158 and an inner fan duct case 162 before traversing (a boss of) a diffuser case 166. In the scenario depicted in FIG. 1A, the borescope assembly 154 may be used to inspect one or more components of a combustor 170.

Referring to FIGS. 1A and 1B, a slider seal 158a may be located on the outer duct case 158 and a slider seal 162a may be located on the inner duct case 162. The seals 158a and 162a account for axial and radial clearances to accommodate seating the borescope assembly 154. Issues may arise when inserting (or withdrawing) the borescope assembly 154 through (or from) the seals 158a and 162a. For example, at least one of the seals 158a and 162a may slip into/in-between grooves of an exposed spring 154a of the borescope assembly 154 during installation or removal, preventing the borescope assembly 154 from moving, e.g., radially in-and-out. Such a condition increases the time to perform an inspection (e.g., there may be a delay until the spring 154a can be freed from the seal 158a and/or the seal 162a) and may even degrade the operability/performance of the seals 158a and 162a. Additionally, the spring 154a catching on the hardware (e.g., the seal 158a and/or the seal 162a) may lead to operator/technician frustration, thereby serving as a potential source of distraction to the operator.

Accordingly, what is needed is an ability to easily and reliably install and uninstall/remove/withdraw a borescope assembly on an engine without compromising the structural integrity or operability of components (e.g., the seals 158a and 162a) of the engine.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a borescope assembly, comprising: a spring, a housing sleeve, a washer sleeve at least partially nested within the housing sleeve, and a plug coupled to the housing sleeve, where the spring is completely contained within the housing sleeve and the washer sleeve. In some embodiments, the housing sleeve is configured to translate relative to the washer sleeve. In some embodiments, the borescope assembly further comprises: a seal ring coupled to the plug. In some embodiments, the borescope assembly further comprises: a collar coupled to the plug, where the seal ring is disposed between the collar and the plug. In some embodiments, the collar is coupled to the plug via at least one of a pin or a threaded interface. In some embodiments, the borescope assembly further comprises: a pin that couples the housing sleeve to the plug. In some embodiments, the plug includes a recess that seats a pin of a bushing. In some embodiments, a combined length of the housing sleeve and the washer sleeve is greater than a length of the spring.

Aspects of the disclosure are directed to a system for an engine defined about an axial centerline, comprising: an inner case that includes a bushing, a duct case radially outward of the inner case with respect to the axial centerline, a seal located on the duct case, and a borescope assembly that traverses the seal and the bushing in mounting to the inner case, the borescope assembly including: a spring, a housing sleeve, and a washer sleeve at least partially nested within the housing sleeve, where the spring is isolated from the seal by the housing sleeve and the washer sleeve such that the spring is contact-free with respect to the seal. In some embodiments, the housing sleeve is configured to translate relative to the washer sleeve. In some embodiments, the borescope assembly includes a plug and a seal ring coupled to the plug. In some embodiments, the borescope assembly includes a collar coupled to the plug, and the seal ring is disposed between the collar and the plug. In some embodiments, the collar is coupled to the plug via at least one of a pin or a threaded interface. In some embodiments, the borescope assembly includes a pin that couples the housing sleeve to the plug. In some embodiments, the borescope assembly includes a plug, and the plug defines a recess, and the bushing includes a pin that is seated in the recess. In some embodiments, the plug defines a second recess, and the bushing includes a second pin that is seated in the second recess. In some embodiments, a combined length of the housing sleeve and the washer sleeve is greater than a length of the spring, and the borescope assembly is defined about an axis, and the spring is located radially inward of the housing sleeve and the washer sleeve with respect to the axis. In some embodiments, the system further comprises: a second duct case radially outward of the duct case with respect to the axial centerline, and a second seal located on the second duct case, where the borescope assembly traverses the second seal.

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

DETAILED DESCRIPTION

Figure 1:
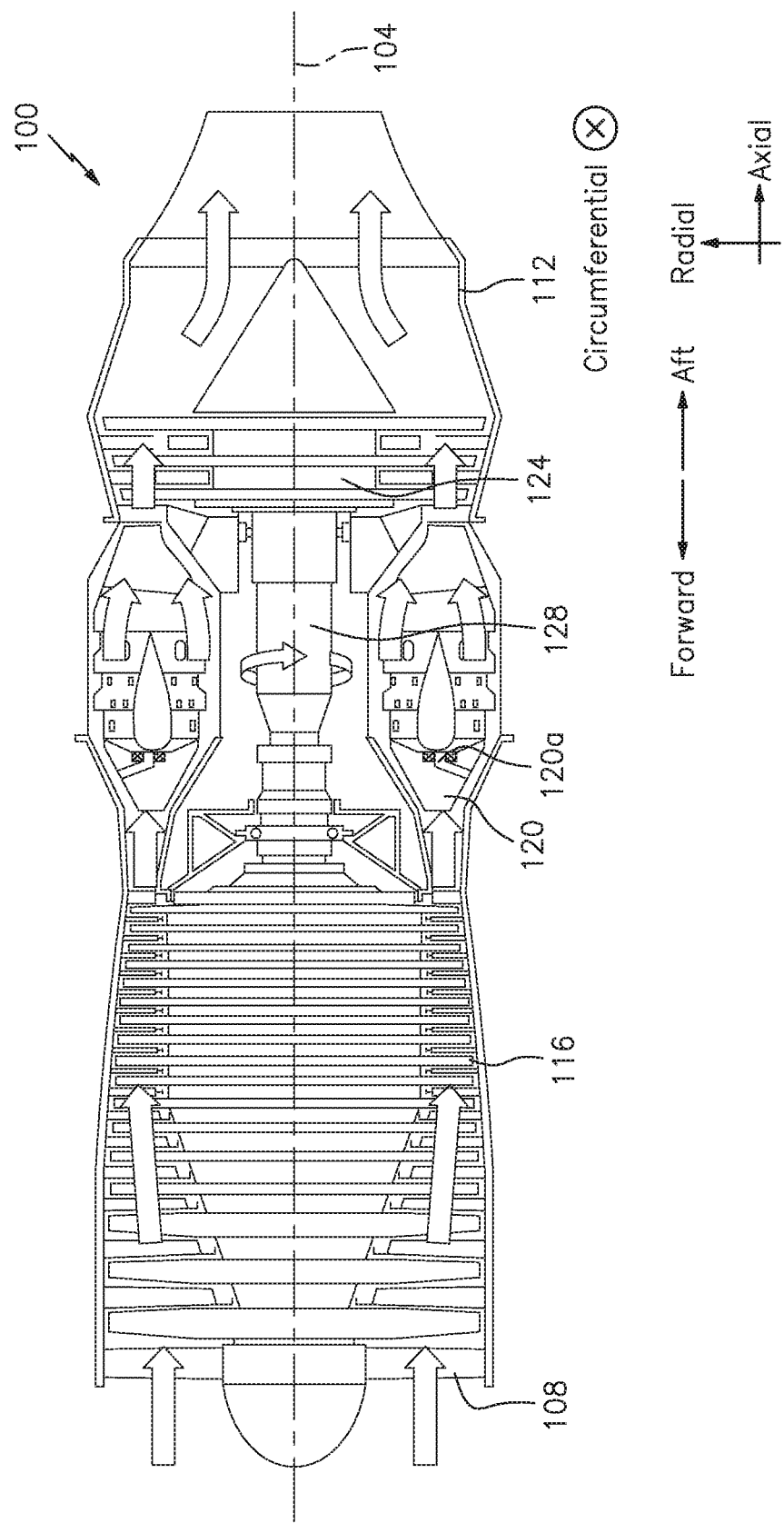
FIG. 1 is a side cutaway illustration of a gas turbine engine.
Figure 1A:
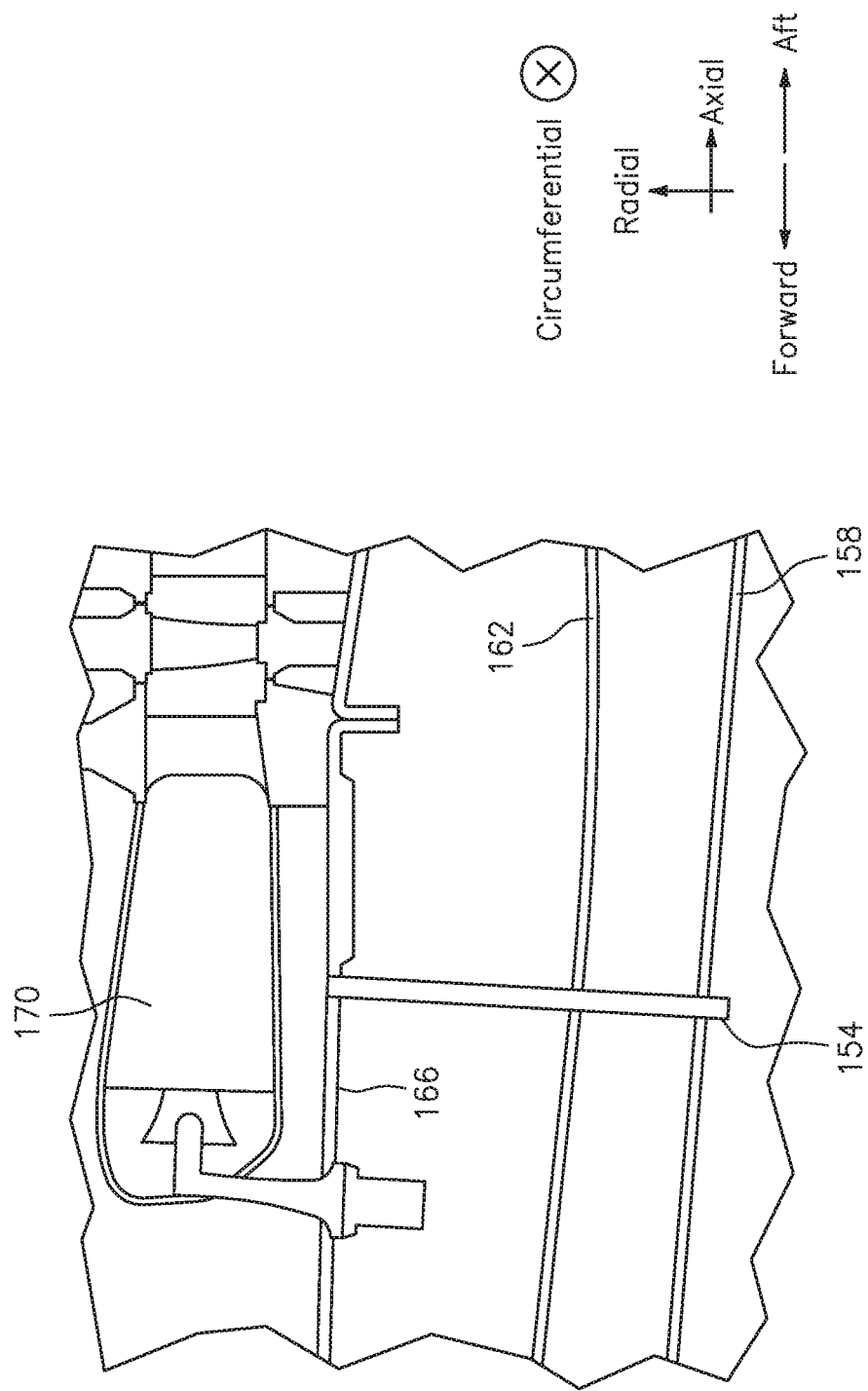
FIG. 1A illustrates a borescope assembly installed on an engine in accordance with the prior art.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities and/or a space between entities.

Aspects of the disclosure may be applied in connection with an engine. FIG. 1 is a side cutaway illustration of an engine 100. The engine 100 may extend along a longitudinal axial centerline 104 between, e.g., an upstream/forward airflow inlet 108 and a downstream/aft airflow exhaust nozzle 112. The engine 100 may include a compressor section 116, a combustor section 120, and a turbine section 124.

During operation, air may enter the engine 100 through the inlet 108 where it may be compressed by the compressor section 116. The compressed air may be provided to the combustor section 120. In the combustor section 120, the compressed air may be mixed with fuel provided by one or more fuel nozzles 120a and ignited to power the engine 100. The output of the combustor section 120 may be provided to the turbine section 124. The turbine section 124 may extract energy from the output of the combustor section 120 to drive the compressor section 116 via a rotation of a shaft 128 that couples (e.g., mechanically couples) the compressor section 116 and the turbine section 124. The combusted fuel-air mixture may be exhausted via the nozzle 112.

FIG. 1 represents one possible configuration for an engine. Aspects of the disclosure may be applied in connection with other environments, including additional configurations for engines. For example, aspects of the disclosure may be applied in connection with turbofan engines, turboprops, turboshafts, etc.

Figure 2:
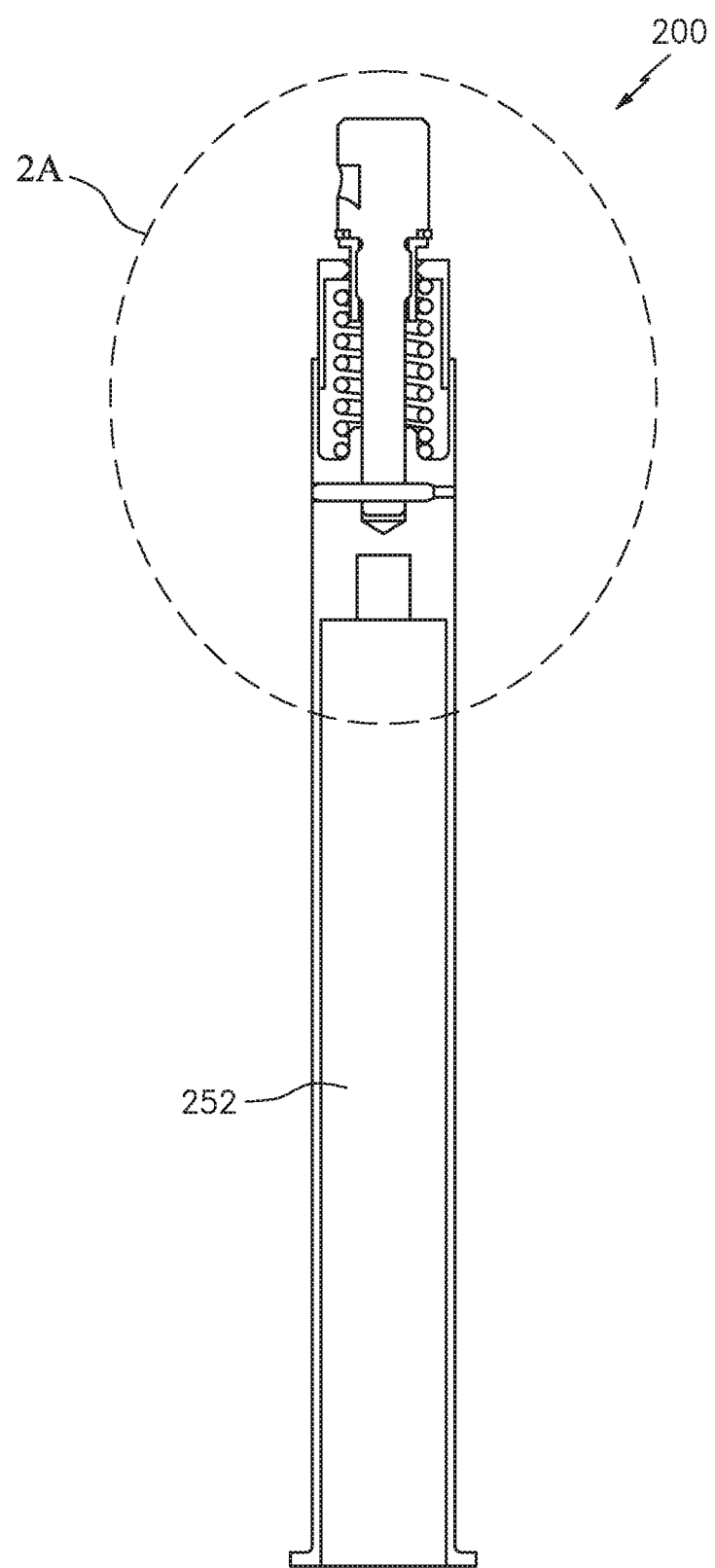
FIG. 2 illustrates a borescope assembly in accordance with aspects of this disclosure.
Figure 2A:
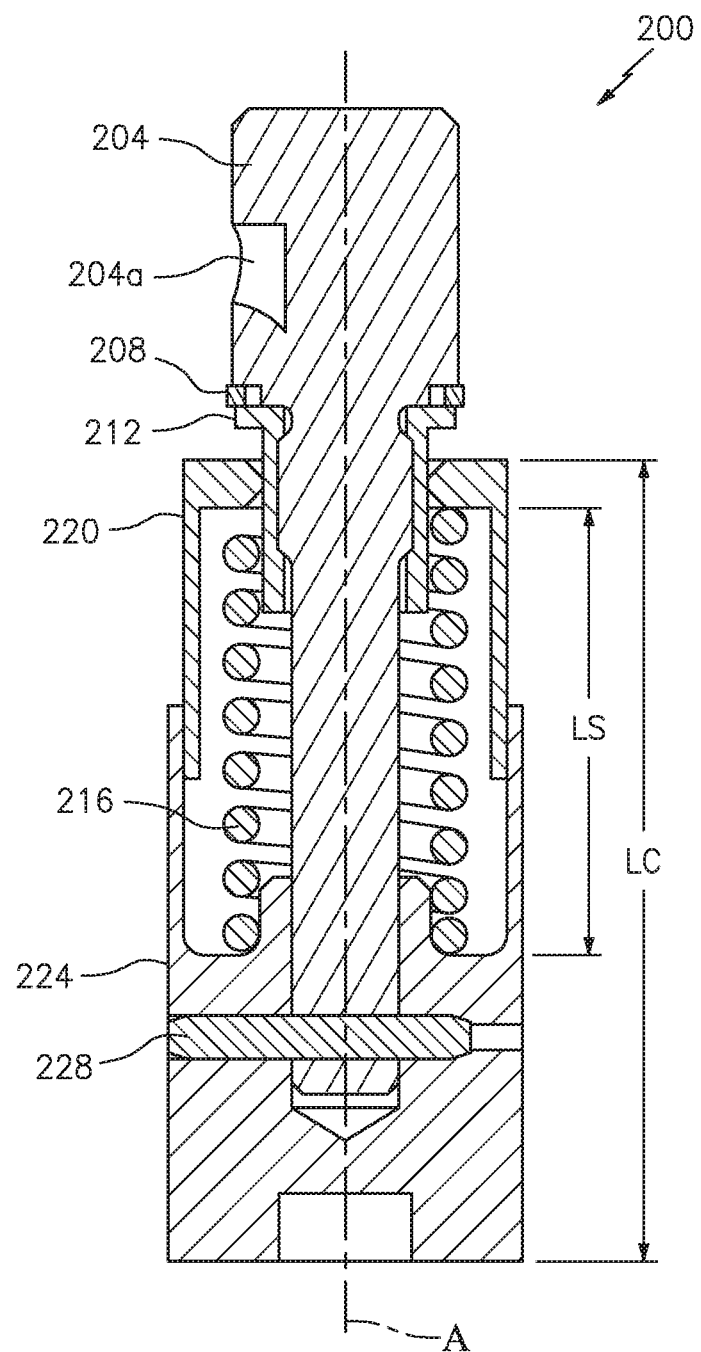
FIG. 2A illustrates a portion of the borescope assembly of FIG. 2.

Referring to FIGS. 2-2A, a borescope assembly 200 is shown. The borescope assembly 200 includes a number of components that are discussed in further detail below.

The borescope assembly 200 may include a plug 204. The plug 204 may be inserted into a bushing (e.g., bushing 304 of FIG. 3) that is mounted to a structure of an engine, such as for example a case of the engine. The plug 204 may serve as a first sealing interface with respect to the bushing/diffuser case.

The borescope assembly 200 may include a seal ring 208. The seal ring 208, which may have characteristics in common with a piston ring seal, may serve as a second sealing interface with respect to the bushing/diffuser case. For example, the seal ring 208 (in conjunction with the plug 204) may provide redundancy in terms of sealing, which may be helpful given elevated pressures that may be present in/contained by the diffuser case. The borescope assembly 200 may include a collar 212. The collar 212 may secure the seal ring 208 in position about the plug 204. In some embodiments, the collar 212 may include a threaded interface that serves to couple the collar 212 to the plug 204. In some embodiments, a pin (not shown) may be used to couple the collar 212 to the plug 204.

The borescope assembly 200 may include a spring 216. The spring 216, which may expand or compress based on an applied force, may facilitate the installation or removal of the borescope assembly 200 to/from a diffuser case as described further below.

The borescope assembly 200 may include a washer sleeve 220 and a housing sleeve 224. The washer sleeve 220 may interface to/abut the bushing (e.g., bushing 304 illustrated in FIG. 3) when the borescope assembly 200 is installed on the engine. The housing sleeve 224 (or an extended portion/handle 252 thereof) may correspond to the portion of the borescope assembly 200 that a mechanic/operator interfaces with/manipulates when operating the borescope assembly 200 during, e.g., an inspection activity.

The washer sleeve 220 and the housing sleeve 224 may be coaxial with respect to the axis 'A' of the borescope assembly 200. As shown in FIG. 2A, at least a portion of the washer sleeve 220 may be nested within the housing sleeve 224. Relative to the axis 'A' shown in FIG. 2A, at least a portion of the housing sleeve 224 may be radially outward of the washer sleeve 220.

The housing sleeve 224 may translate/slide relative to the washer sleeve 220. For example, urging the housing sleeve 224/handle 252 in an upward direction in FIG. 2/2A may cause the spring 216 to compress against the upper surface of the washer sleeve 220. Compression of the spring 216 may facilitate installation of the plug 204 about the bushing. Conversely, a retraction of the housing sleeve 224 (e.g., movement of the housing sleeve 224/handle 252 in the downward direction [away from the plug 204] in FIG. 2/2A) may allow the spring 216 to expand. When the spring 216 is expanded/in a free-state, the borescope assembly 200 may be removed from the engine.

Figure 1B:
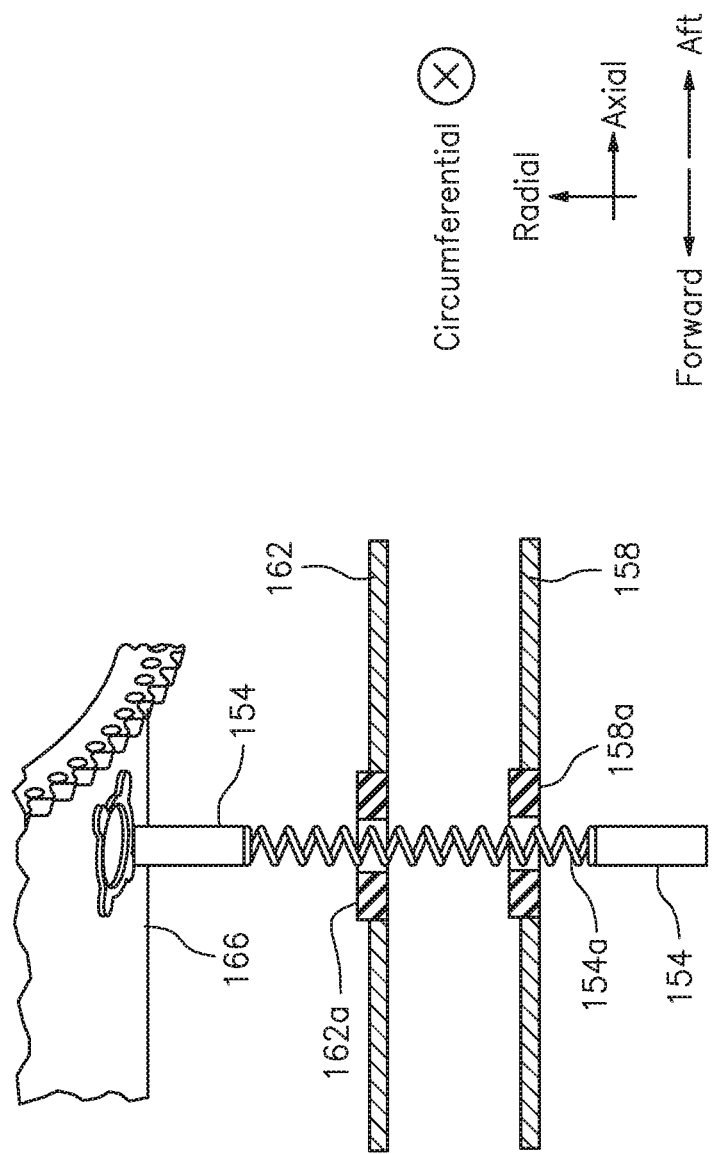
FIG. 1B illustrates a spring of the borescope assembly of FIG. 1A in relation to slider seals in accordance with the prior art.

As shown in FIG. 2A, the spring 216 may be completely contained within the washer sleeve 220 and the housing sleeve 224. For example, the combined length LC of the washer sleeve 220 and the housing sleeve 224 may be greater than the length LS of the spring 216, and the spring 216 may be located radially inward of the sleeves 220 and 224 (relative to the axis 'A' in FIG. 2A) during all operating states/conditions of the borescope assembly 200 (e.g., during any state of contraction/expansion of the spring 216). As a result, hardware (e.g., the seals 158a and 162a of FIG. 1B) that is external to the borescope assembly 200 may be prevented from getting caught up within/snagged by the spring 216. Stated differently, the washer sleeve 220 and the housing sleeve 224 may shield/isolate the spring 216 with respect to the external hardware, such that the spring 216 remains contact-free with respect to such hardware. This may be contrasted with the scenario described above in conjunction with FIG. 1B, e.g., where the spring 154a is exposed to and contacts the seals 158a and 162a. The borescope assembly may include a pin 228. The pin 228 may couple the housing/housing sleeve 224 to the plug 204.

Figure 3:
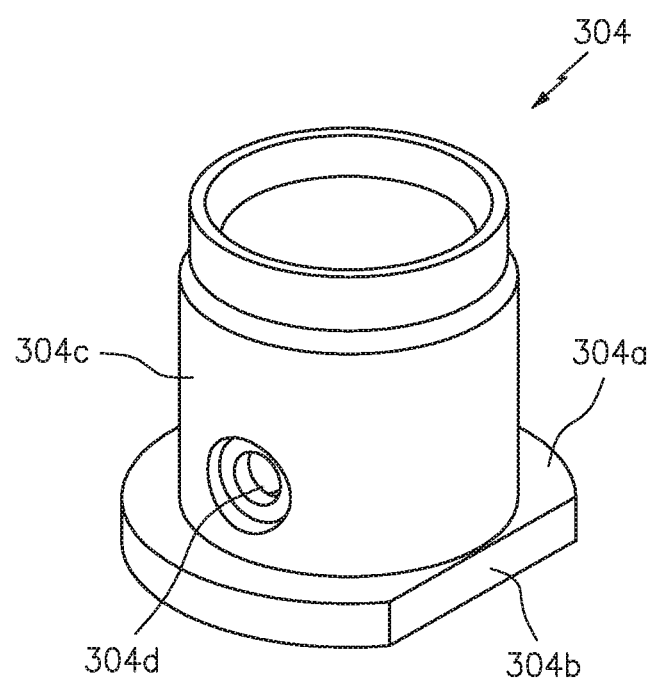
FIG. 3 illustrates a bushing in accordance with aspects of this disclosure.

Referring to FIG. 3, a bushing 304 is shown. The bushing 304 may be installed on, e.g., a case of an engine via a press/interference fit. Other techniques (e.g., welding, brazing, application of an adhesive, etc.) for installing the bushing 304 may be used.

The bushing 304 may include a lip 304a that is substantially round. A portion of the lip 304a may include a flat edge 304b that may be oriented, e.g., perpendicular to engine centerline (e.g., centerline 104 of FIG. 1) when the bushing 304 is installed on the engine. The flat edge 304b may correspond to a keyed interface to ensure that the bushing 304 is installed in accordance with a predetermined orientation.

Figure 3A:
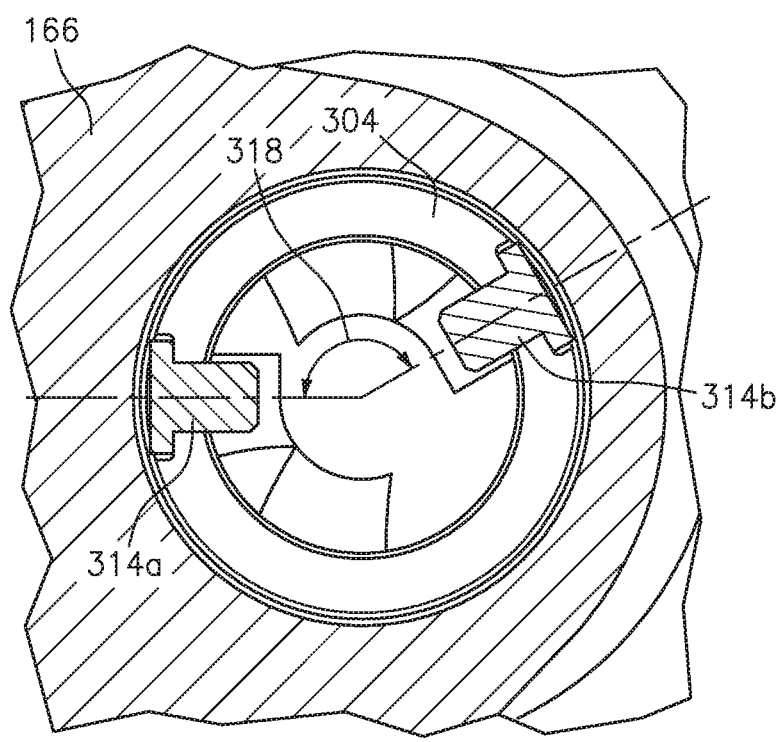
FIG. 3A illustrates bushing pins oriented about the bushing of FIG. 3.

The bushing 304 may include a wall 304c that emanates from the lip 304a. The wall 304c may define one or more holes/apertures (e.g., aperture 304d) that may seat respective bushing pins (e.g., bushing pins 314a and 314b as shown in FIG. 3A). The bushing pins 314a and 314b (or, analogously, the respective apertures in the wall) may be separated from one another about the circumference of the bushing 304 (e.g., the wall 304c) by an angle 318. The angle 318 may be equal to (approximately) one-hundred fifty degrees (+/−ten degrees) in some embodiments.

The angle 318 may be selected to match a clocking associated with the plug 204 of FIG. 2A. For example, the pin 314a may be seated within a (first) plug recess 204a of the plug 204 and the pin 314b may seated within a second/another plug recess (not shown) of the plug 204. In this respect, during installation of the borescope assembly 200/plug 204 about the engine, the borescope assembly 200/plug 204 may be inserted into the diffuser case and then turned/twisted to align a given plug recess with a respective bushing pin. Accordingly, the plug 204 and bushing 304 may accommodate a bayonet type of installation/removal (e.g., an insert and twist type of motion may be used) of the borescope assembly 200.

One or more of the components described herein may be made/composed of one or more materials. For example, one or more of the components may be composed of one or more of nickel, aluminum, steel, titanium, etc.

As described herein, aspects of the disclosure are directed to a borescope assembly that may be selectively, reliably, and easily installed or removed from an engine frame/case structure. The borescope assembly may be used as part of a blind inspection procedure, where visibility to surrounding engine hardware may be at least partially (if not completely) obscured. One or more sleeves of the borescope assembly may shield/isolate a spring of the borescope assembly from engine hardware. This shielding/isolation may limit (e.g., prevent) the engine hardware from catching on the spring, thereby helping to preserve the integrity/operability of the engine hardware and reducing (e.g., minimizing) the amount of time it takes to perform an inspection.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A borescope plug assembly defined about an axis, the borescope plug assembly comprising:
   a handle defining a first axial end of the borescope plug assembly;
   a housing sleeve mounted to a distal axial end of the handle opposite the first axial end;
   a plug comprising a plug shaft fixedly coupled to the housing sleeve, the plug further comprising a plug member mounted to the plug shaft and defining a second axial end of the borescope plug assembly opposite the first axial end;
   a washer sleeve at least partially nested within the housing sleeve, the washer sleeve circumferentially disposed about the plug shaft and configured to axially translate relative to the plug shaft;
   a spring disposed radially inside the housing sleeve and the washer sleeve and radially outside the plug shaft, the spring configured to be axially compressed between the housing sleeve and the washer sleeve,
   wherein the spring is completely contained within the housing sleeve and the washer sleeve.

2. The borescope plug assembly of claim 1, wherein the housing sleeve is configured to translate relative to the washer sleeve.

3. The borescope plug assembly of claim 1, further comprising:
   a seal ring coupled to the plug.

4. The borescope plug assembly of claim 3, further comprising:
   a collar disposed about the plug shaft and coupled to the plug, the collar disposed radially inside of the spring and the washer sleeve,
   wherein the seal ring is axially disposed between the collar and the plug.

5. The borescope plug assembly of claim 1, further comprising:
   a pin that couples the housing sleeve to the plug shaft.

6. The borescope plug assembly of claim 1, wherein the plug member includes a recess configured to seats a pin of a bushing when the plug member is inserted into the bushing.

7. The borescope plug assembly of claim 1, wherein a combined length of the housing sleeve and the washer sleeve is greater than a length of the spring.

8. A system for an engine defined about an axial centerline, comprising:
   an inner case that includes a bushing;
   a duct case radially outward of the inner case with respect to the axial centerline;
   a seal located on the duct case; and
   a borescope plug assembly that traverses the seal and the bushing in mounting to the inner case, the borescope plug assembly defined about an axis and including:
   a handle defining a first axial end of the borescope plug assembly;
   a housing sleeve mounted to a distal axial end of the handle opposite the first axial end;
   a plug comprising a plug shaft fixedly coupled to the housing sleeve, the plug further comprising a plug member mounted to the plug shaft and defining a second axial end of the borescope plug assembly opposite the first axial end, the plug member retained within the bushing
   a washer sleeve at least partially nested within the housing sleeve, the washer sleeve circumferentially disposed about the plug shaft and configured to axially translate relative to the plug shaft; and
   a spring disposed radially inside the housing sleeve and the washer sleeve and radially outside the plug shaft, the spring configured to be axially compressed between the housing sleeve and the washer sleeve,
   wherein the spring is isolated from the seal by the housing sleeve and the washer sleeve such that the spring is contact-free with respect to the seal.

9. The system of claim 8, wherein the housing sleeve is configured to translate relative to the washer sleeve.

10. The system of claim 8, wherein the borescope plug assembly includes a seal ring coupled to the plug.

11. The system of claim 10, wherein the borescope plug assembly includes a collar disposed about the plug shaft and coupled to the plug, the collar disposed radially inside of the spring and the washer sleeve, and wherein the seal ring is axially disposed between the collar and the plug.

12. The system of claim 8, wherein the borescope plug assembly includes a pin that couples the housing sleeve to the plug shaft.

13. The system of claim 8, wherein the plug member defines a recess and wherein the bushing includes a pin that is seated in the recess.

14. The system of claim 13, wherein the plug member defines a second recess, and wherein the bushing includes a second pin that is seated in the second recess.

15. The system of claim 8, wherein a combined length of the housing sleeve and the washer sleeve is greater than a length of the spring.

16. The system of claim 8, further comprising:
    a second duct case radially outward of the duct case with respect to the axial centerline; and
    a second seal located on the second duct case,
    wherein the borescope plug assembly traverses the second seal.

* * * * *